(12) United States Patent
Bruneau et al.

(10) Patent No.: US 11,924,320 B2
(45) Date of Patent: Mar. 5, 2024

(54) DEVICES AND METHODS FOR PROTECTING CRYPTOGRAPHIC PROGRAMS

(71) Applicant: SECURE-IC SAS, Cesson-Sevigne (FR)

(72) Inventors: Nicolas Bruneau, Montrouge (FR); Adrien Facon, Paris (FR); Sylvain Guilley, Paris (FR)

(73) Assignee: SECURE-IC SAS, Cesson-Sevigne (FR)

( * ) Notice: Subject to any disclaimer, the term of this patent is extended or adjusted under 35 U.S.C. 154(b) by 402 days.

(21) Appl. No.: 17/275,166

(22) PCT Filed: Sep. 11, 2019

(86) PCT No.: PCT/EP2019/074178
§ 371 (c)(1),
(2) Date: Mar. 10, 2021

(87) PCT Pub. No.: WO2020/058051
PCT Pub. Date: Mar. 26, 2020

(65) Prior Publication Data
US 2021/0367755 A1 Nov. 25, 2021

(30) Foreign Application Priority Data
Sep. 17, 2018 (EP) .................................... 18306206

(51) Int. Cl.
*G06F 21/00* (2013.01)
*H04L 29/06* (2006.01)
(Continued)

(52) U.S. Cl.
CPC .............. *H04L 9/002* (2013.01); *G06F 8/433* (2013.01); *H04L 2209/04* (2013.01); *H04L 2209/08* (2013.01)

(58) Field of Classification Search
CPC .................................. G06F 8/433; H04L 9/002
See application file for complete search history.

(56) References Cited

U.S. PATENT DOCUMENTS

| 6,725,374 B1 * | 4/2004 | Jahnich ................. G06F 21/755 |
| | | 380/216 |
| 8,311,211 B2 * | 11/2012 | Abernethy, Jr. ...... H04L 9/0631 |
| | | 713/400 |

(Continued)

FOREIGN PATENT DOCUMENTS

EP      3 367 606 A1      8/2018

OTHER PUBLICATIONS

Ali Galip Bayrak et al., Automatic Application of Power Analysis Countermeasures, Feb. 2015, IEEE Transactions on Computers, vol. 64, No. 2, pp. 329-340 (Year: 2015).*

(Continued)

*Primary Examiner* — Rodman Alexander Mahmoudi
(74) *Attorney, Agent, or Firm* — BakerHostetler

(57) ABSTRACT

There is provided a device for protecting a cryptographic program implemented in a cryptographic computing device, the cryptographic computing device includes one or more processors, the cryptographic program comprising instructions and being associated with an initial execution order of the instructions. The device comprises a compiler to compile the cryptographic program, which provides an intermediate representation of the cryptographic program comprising instructions and variables used to execute the instructions. The device is configured to: determine a graph of dependencies comprising nodes and edges, each node of the graph representing an instruction of the intermediary representation, and each edge of the graph representing a variable of the intermediary representation; mask the graph of dependencies by replacing each variable of the graph of dependencies with a masked variable, the processing unit deter- (Continued)

mining the masked variable by applying a masking scheme to the variable, which provides a masked graph of dependencies; determine at least a set of independent instructions using the masked graph of dependencies; determine an execution order for each set of independent instructions from the initial execution order, the execution order representing the order of execution of the set of independent instructions by at least one of the one or more processors.

9 Claims, 6 Drawing Sheets

(51) Int. Cl.
    *H04L 9/00*     (2022.01)
    *G06F 8/41*     (2018.01)

(56) References Cited

U.S. PATENT DOCUMENTS 9,323,644 B1 *   4/2016   Hale ................ G06F 8/22
2018/0123778 A1 *   5/2018   Vigilant ............ H04L 9/004

OTHER PUBLICATIONS

Bayrak, et al., "Automatic Application of Power Analysis Countermeasures", IEEE Transactions on Computers, vol. 64, Issue: 2, pp. 329-341, Feb. 2015.

Veyrat-Charvillon, et al., "Shuffling against Side-Channel Attacks: A Comprehensive Study with Cautionary Note", International Conference on the Theory and Application of Cryptology and Information Security, ASIACRYPT 2012: Advances in Cryptology—ASIACRYPT, pp. 740-757, 2012.

Kocher, et al., "Differential Power Analysis (DPA)", Advances in Cryptology—CRYPTO, vol. 1666, Series Lecture Notes in Computer Science, pp. 388-397, 1990.

Brier, et al., "Correlation Power Analysis with a Leakage Model", Cryptographic Hardware and Embedded Systems (CHES), vol. 3156 of the Series Lecture Notes in Computer Science, pp. 16-29, 2004.

Chari, et al., "Towards Sound Approaches to Counteract Power-Analysis Attacks", Advances in Cryptology, CRYPTO' 99, Lecture Notes in Computer Science, vol. 1666,1999.

Goubin, "A Sound Method for Switching between Boolean and Arithmetic Masking", Cryptographic Hardware and Embedded Systems, CHES 2001, Lecture Notes in Computer Science, vol. 2162, 2001.

Golić, et al., "Multiplicative Masking and Power Analysis of AES", Cryptographic Hardware and Embedded Systems, CHES 2002, Lecture Notes in Computer Science, vol. 2523, 2003.

Fumaroli, et al., "Milne Masking against Higher-Order Side Channel Analysis", Selected Areas in Cryptography, Lecture Notes in Computer Science, vol. 6544, 2011.

Goubin, et al., "DES and Differential Power Analysis the "Duplication" Method", International Workshop on Cryptographic Hardware and Embedded Systems CHES 1999: Cryptographic Hardware and Embedded Systems, pp. 158-172, 1999.

* cited by examiner $I: a = b + c \times e;$
FIGURE 2.A
$S_1: V_1 = c;$
$S_2: V_2 = e;$
$S_3: V_3 = b;$
$S_4: V_4 = c \times e;$
$S_5: a = V_3 + V_4;$
FIGURE 2.B
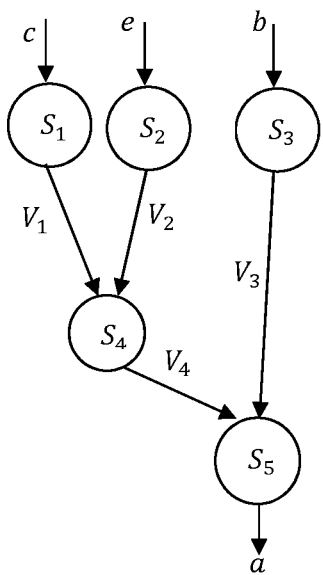
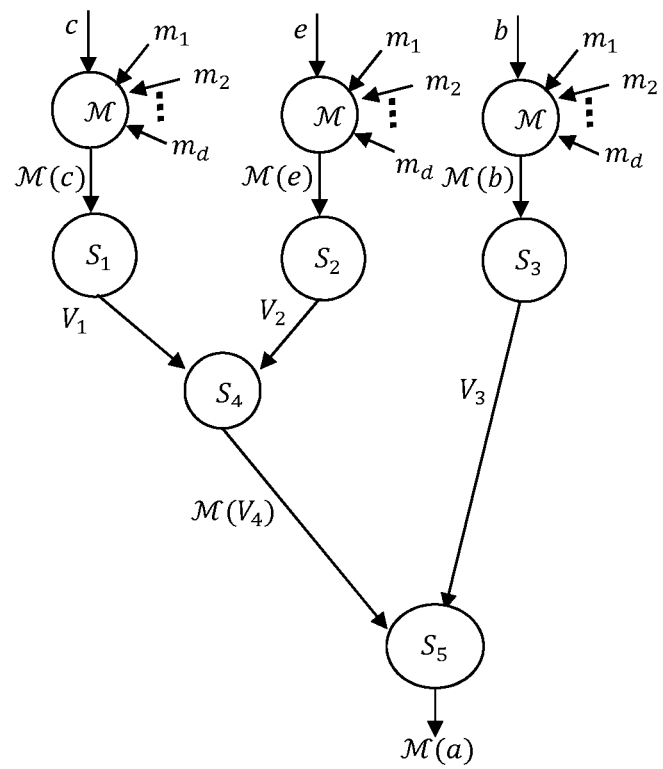
FIGURE 2.C
FIGURE 2.D

DEVICES AND METHODS FOR PROTECTING CRYPTOGRAPHIC PROGRAMS

CROSS-REFERENCE TO RELATED APPLICATIONS

This application is a National Stage of International patent application PCT/EP2019/074178, filed on Sep. 11, 2019, which claims priority to foreign European patent application No. EP 18306206.6, filed on Sep. 17, 2018, the disclosures of which are incorporated by reference in their entirety.

TECHNICAL FIELD

The invention generally relates to the field of cryptography and in particular to protection of cryptographic programs.

BACKGROUND

With the rapid development and the major advances in computer sciences and computer hardware technologies, cryptographic devices (also referred to as "cryptographic computing devices") have become essential items deployed in several communication systems, in data storage systems, and in processing systems.

Cryptographic devices correspond to computing devices that implement cryptographic programs (also referred to as 'cryptographic algorithms'), such cryptographic programs being configured to protect stored, processed, and/or transmitted data against interceptors or eavesdroppers. Cryptographic algorithms may be key-based cryptographic algorithms that make use of secret cryptographic key(s) to provide confidentiality, privacy, integrity, authenticity, and non-repudiation of data during data storage, data processing, or data transit over unsecure networks.

A cryptographic program, like any program, comprises data and instructions, the data including secret information (e.g. secret cryptographic keys) used to implement specific cryptographic primitives. A cryptographic primitive refers to a specific cryptographic function or operation designed to perform a specific task in the cryptographic system such as authentication, public or private key-based encryption/decryption, hash function, or digital signature.

A cryptographic device generally comprises at least one processing element and memory means. A cryptographic program that is to be executed by the cryptographic device is stored in the memory means. Data and instructions of the cryptographic program can be moved from memory means to processing elements via buses. The processing elements execute the instructions of the cryptographic program by performing arithmetic, logical, control, and input/output operations specified by the instructions to perform required cryptographic primitive(s).

Cryptographic devices are prone to attacks that target recovering a part or the totality of the secret data/values/information used during the execution of the cryptographic programs. In particular, physical/hardware attacks such as side-channel attacks, fault attacks and physical tampering represent a growing threat on the security of cryptographic devices.

Side-channel attacks represent attacks against hardware implementations of cryptographic programs that exploit the weaknesses in the implementations of the cryptographic programs. Side-channel attacks rely on the fact that any hardware and software implementation of a cryptographic algorithm is not ideal and leaks some physically observable parameters that depend on the secret data/values/information or on the internal state of the attacked device. Such parameters include time, power consumption and electromagnetic radiation during the execution of the cryptographic program.

Having access to physically leaking cryptographic implementations, an attacker can use the side-channel information to extract the highest possible amount of information related to the secret data/values/information and to possibly recover such secret data/values/information. Exemplary side-channel power attacks comprise:

Differential Power Analysis (DPA) disclosed in "P. Kocher, J. Jaffe, and B. Jun. Differential Power Analysis. Advances in Cryptology-CRYPTO. Volume 1666 of the Series Lecture Notes in Computer Science. Pages 388-397. 1990", and Correlation power analysis (CPA) disclosed for example in "E. Brier, C. Clavier, and F. Olivier. Correlation Power Analysis with a Leakage Model. Cryptographic Hardware and Embedded Systems (CHES). Volume 3156 of the Series Lecture Notes in Computer Science. Pages 16-29. 2004".

DPA and CPA are the most wide-spread practical attacks which target numerous embedded systems such as smart-card microcontrollers and dedicated application specific integrated circuits (ASICs).

Some countermeasures against side-channel attacks exist, such as for example:

Insertion of dummy instructions and random timing shifts;

Randomization of instructions that depend on the secret values/keys for changing the execution order of the instructions while keeping the instructions the same. Such a technique is disclosed for example in "Veyrat-Charvillon N., Medwed M., Kerckhof S., Standaert FX. (2012) Shuffling against Side-Channel Attacks: A Comprehensive Study with Cautionary Note. In: Wang X., Sako K. (eds) Advances in Cryptology, ASIACRYPT 2012. Lecture Notes in Computer Science, vol 7658. Springer, Berlin, Heidelberg";

Replacing some of the critical instructions by assembler instructions whose consumption signature is difficult to analyze;

Transformation of the data for example by performing random splitting or duplication of variables occurring during the computations and dependent on the inputs/outputs into a plurality of variables such that the duplicated variables allow the retrieval of the initial variable. Such techniques are disclosed for example in "Goubin L., Patarin J. (1999) DES and Differential Power Analysis The "Duplication" Method. In: Koç Ç. K., Paar C. (eds) Cryptographic Hardware and Embedded Systems. CHES 1999. Lecture Notes in Computer Science, vol 1717. Springer, Berlin, Heidelberg";

Masking of the data by masking the inputs and/or the outputs of each instruction/operation using random mask values.

Exemplary masking algorithms comprising additive and multiplicative masking algorithms are disclosed in:

Chari S., Jutla C. S., Rao J. R., Rohatgi P. (1999) Towards Sound Approaches to Counteract Power-Analysis Attacks. In: Wiener M. (eds) Advances in Cryptology—CRYPTO'99. CRYPTO 1999. Lecture Notes in Computer Science, vol 1666. Springer, Berlin, Heidelberg;

Goubin L. (2001) A Sound Method for Switching between Boolean and Arithmetic Masking. In: Koç Ç. K., Naccache D., Paar C. (eds) Cryptographic Hardware and Embedded Systems—CHES 2001. CHES 2001. Lecture Notes in Computer Science, vol 2162. Springer, Berlin, Heidelberg;

Golić J. D., Tymen C. (2003) Multiplicative Masking and Power Analysis of AES. In: Kaliski B. S., Koç K., Paar C. (eds) Cryptographic Hardware and Embedded Systems—CHES 2002. CHES 2002. Lecture Notes in Computer Science, vol 2523. Springer, Berlin, Heidelberg, and Fumaroli G., Martinelli A., Prouff E., Rivain M. (2011) Affine Masking against Higher-Order Side Channel Analysis. In: Biryukov A., Gong G., Stinson D. R. (eds) Selected Areas in Cryptography. SAC 2010. Lecture Notes in Computer Science, vol 6544. Springer, Berlin, Heidelberg.

Existing countermeasures only provide partial protection of data and are not sufficient to achieve a full security and protection of sensitive data used in cryptographic computing devices especially against side-channel attacks.

There is accordingly a need for improving the protection of cryptographic program implementations against side-channel attacks.

SUMMARY

In order to address these and other problems, there is provided a device for protecting a cryptographic program implemented in a cryptographic computing device, the cryptographic computing device comprising one or more processors, the cryptographic program comprising instructions and being associated with an initial execution order of the instructions, wherein the device comprises a compiler configured to compile the cryptographic program, which provides an intermediate representation of the cryptographic program comprising instructions and variables used to execute the instructions, the device further comprising a processing unit configured to:

determine a graph of dependencies comprising nodes and edges, each node of the graph representing an instruction of the intermediary representation, and each edge of the graph representing a variable of the intermediary representation;

mask the graph of dependencies by replacing each variable of the graph of dependencies with a masked variable, the processing unit determining the masked variable by applying a masking scheme to the variable, which provides a masked graph of dependencies;

determine at least a set of independent instructions using the masked graph of dependencies;

determine an execution order for each set of independent instructions from the initial execution order, the execution order representing the order of execution of the set of independent instructions by at least one of the one or more processors.

In some embodiments, the masking scheme may be a $d^{th}$-order masking scheme that uses a plurality of d mask values to mask each variable, the processing unit being configured to determine each masked variable from a given variable by splitting the given variable into a plurality of d+1 variables and applying a masking operation to the given variable and the plurality of d mask values.

The masking scheme may be an additive masking scheme, the masking operation being an arithmetic or a boolean addition operation over a given group structure.

Alternatively, the masking scheme may be a multiplicative masking scheme, the masking operation being a multiplicative operation over a given group structure.

The processing unit may be configured to determine the mask values randomly using a Pseudo Random Number Generator (PRNG) or a True Random Number Generator (TRNG).

In some embodiments, the processing unit may be configured to change the mask values at regular time intervals.

In some embodiments, the masking scheme may use mask values to determine each masked variable from a given variable, the masked graph of dependencies comprising additional nodes representing values and/or instructions used for generating or modifying the mask values and/or for determining at least one masked variable.

The initial execution order of the instructions may be defined by the order of execution of the instructions in the cryptographic program.

In some embodiments, the nodes representing the independent instructions of each set of independent instructions in the graph of dependency are not linked to each other by edges.

In one embodiment, the processing unit may be configured to determine an execution order for each set of independent instructions by applying a random permutation to the initial execution order.

The masked graph of dependencies and the execution order for each set of independent instructions providing a protected cryptographic program, the compiler may be further configured to compile the protected cryptographic program to produce a protected executable program code.

There is further provided a method for protecting a cryptographic program implemented in a cryptographic computing device comprising one or more processors, the cryptographic program comprising instructions and being associated with an initial execution order of the instructions, wherein the method comprises:

compiling the cryptographic program, which provides an intermediate representation of the cryptographic program comprising instructions and variables used to execute the instructions;

determining a graph of dependencies comprising nodes and edges, each node of the graph representing an instruction of the intermediary representation, each edge of the graph representing a variable of the intermediary representation;

masking the graph of dependencies by replacing each variable in the graph of dependencies with a masked variable determined by applying a masking scheme to the variable, which provides a masked graph of dependencies;

determining at least a set of independent instructions using the masked graph of dependencies;

determining an execution order for each set of independent instructions from the initial execution order, the execution order representing the execution order of the set of independent instructions by at least one of the one or more processors.

Advantageously, the various embodiments of the invention provide a protection of cryptographic devices against side-channel attacks.

Advantageously, the various embodiments of the invention provide masked cryptographic programs in which data is protected using masking schemes and the order of execution of independent instructions is permuted/changed. Such techniques provide a protection of the cryptographic programs against side-channel attacks that may exploit the knowledge of the execution order of the instructions that depend on secret values to extract the highest amount of secret information.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention.

FIG. 2A represents an example of a program;

FIG. 2B represents an example of an intermediate representation of the program depicted in FIG. 2B;

FIG. 2C represents a graph of the dependencies related to the intermediate representation illustrated in FIG. 2B;

FIG. 2D is a graph representing a protection of the program depicted in FIG. 2A, according to some embodiments;

DETAILED DESCRIPTION

Embodiments of the disclosure provide devices and methods for securing cryptographic programs implemented on cryptographic computing devices against side-channel attacks.

As used herein, a "program" (or an "algorithm") generally refers to a sequence of operations and/or similar processing leading to a desired result where the operations may involve physical manipulations of physical quantities that can take various forms such as signals capable of being stored, transferred, combined, compared and/or otherwise manipulated (e.g. electrical, magnetic and/or electromagnetic signals). Depending on the application of the invention, such signals can be represented by bits, data, values, elements, etc. As used in the present description, terms such as "storing", "processing", "retrieving", "calculating", "determining" etc. generally refer to actions of a computing device that manipulates and/or transforms data which may represent or relate to physical quantities.

The various embodiments of the invention may be implemented for securing any cryptographic computing device that implements one or more cryptographic programs configured to ensure data security, signal security, authentication, protection, and/or privacy in a cryptographic system (also referred to as tryptosystem). The cryptographic computing devices may be used in various storage, information processing or communication systems.

Figure 1:
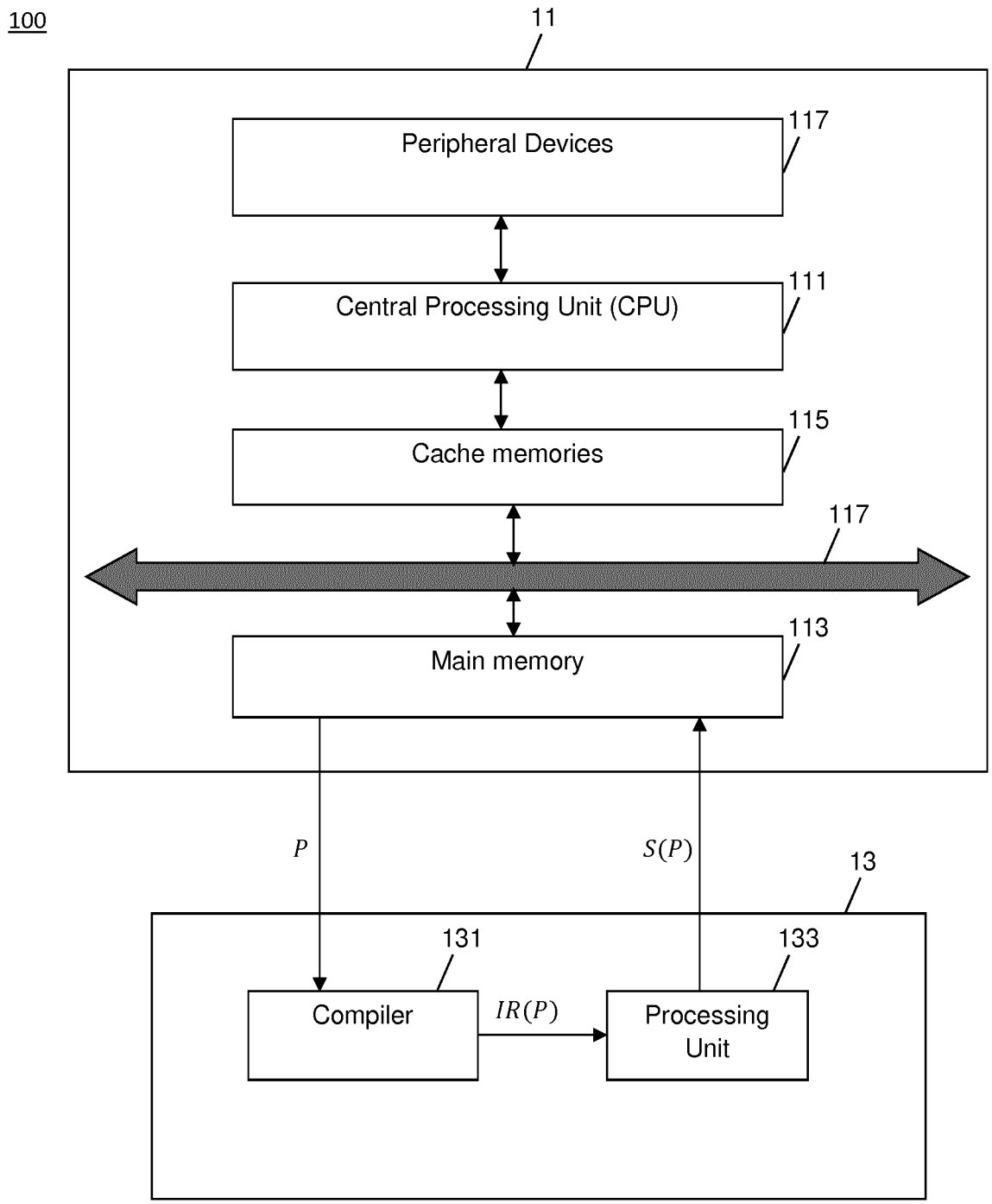
FIG. 1 is a block diagram depicting a device for protecting a cryptographic program implemented in a cryptographic computing device, according to some embodiments of the invention.

With reference to FIG. 1, there is shown an example of the implementation of the disclosure to protect a cryptographic computing device 11 (also referred to a 'cryptographic device') operating in a cryptographic system 100. The cryptographic system 100 may be any information system, data storage, processing system, and/or communication system.

The cryptographic computing device 11 may be used in various application fields comprising, without limitations, digital electronics, communications (e.g. digital, wired, wireless, cellular/radio, optical, satellite, acoustic, and molecular communications), computing networks/systems, data center interconnections, digital data storage, recording (e.g. magnetic and optical recording), data and information processing (e.g. databases, online sale systems, financial systems), positioning systems, digital television and video broadcasting, identity (e.g. electronic passport systems, banking), transportation (e.g. in inertial guidance systems, in GPS receivers, motor controllers, and in electric and hybrid vehicles), medicine (in medical equipment for example in electronic stethoscopes and medical imaging equipment), etc. For example, in an application of the invention to storage systems, the cryptographic system 100 may be any secure data storage system, while the cryptographic computing device 11 may represent any fixed or mobile storage device such as memory cards or hard discs with logon access monitored by cryptographic algorithms.

In another exemplary application of the invention to information processing systems, the cryptographic system 100 may be for example a computer system, a database, an online sale system or a financial system implementing cryptographic programs for securing data exchanged or stored in the system, such as personal financial account numbers, social security numbers, or medical data. The cryptographic device 11 may be any embedded device such as a smart card, or an RFID tag used for example in the car industry to ensure anti-theft protection, in service provider systems to secure access cards. The cryptographic device 11 may be used also in the context of embedded devices and equipment manufacturing to provide a protection of hardware and/or software algorithms against cloning and reverse engineering, or in the banking industry to secure banking accounts and financial transactions.

In still another exemplary application of the invention to communication systems, the cryptographic system 100 may be a wired, wireless ad-hoc, radio, or optical transmission system. The cryptographic computing device 11 may be for example a user terminal/equipment (e.g. smart-phone), a relay or a base station deployed in wireless communication networks (e.g. cellular networks) and implementing cryptographic programs for ensuring security of data during its transit over unsecure communication media. The cryptographic computing device 11 may be fixed or mobile. The cryptographic computing device 11 may be configured to operate in wired, wireless, radio, or optical fiber-based communication networks.

More generally, the cryptographic computing device 11 may be any device, computer, computing machine, or embedded system, programmed and/or programmable to execute cryptographic programs. Exemplary cryptographic computing devices 11 comprise without limitations:

electrical and digital electronic devices (e.g. MP3 players video game consoles, digital cameras, GPS receivers, digital watches, recorders, digital cameras);

computers (e.g. desktop computers and laptops), tablets; routers, switches, printers;

mobile phones, base stations, relay stations, satellites;

Internet of Things (IoT) devices, robots, drones;

smartcards used for example in financial transactions, restricted access, telecommunication, military applications, secure communication equipment, Automated Teller machines, TV set-top boxes, etc.

Further, the cryptographic computing device 11 may be a standalone device or may be connected to external devices, machines or systems for example in computer networking systems (e.g. small or large area wired or wireless access networks).

The embodiments of the invention may be implemented in all the life cycles of the cryptographic computing device 11, such as for example in the phase of designing or developing of a cryptographic computing device 11 or evaluating the security of manufactured embedded systems in a certification process.

Further, the embodiments of the invention may be applied to protect cryptographic programs implemented in hardware devices such as electronic circuits, any software cryptographic program (or algorithm) operating on computer systems or any hybrid system deploying both hardware and software cryptographic components.

The cryptographic computing device 11 carries out cryptographic programs which can be configured to:
  protect sensitive data and/or signals from hardware and/or software attacks; and/or
  ensure data security, signal security, encryption, integrity, authentication, replay protection, and/or privacy.

Encryption can be used to protect the confidentiality of data and/or signals. Integrity protection enables preventing an attacker from causing hidden modifications to the encrypted data stored in memory. Replay protection enables eliminating undetected temporal substitution of the encrypted data.

Encrypted data may be stored or transmitted in communication applications. For example, encryption may be used to encrypt a bitstream to be used in a programmed FPGA.

In such example, an encryption algorithm (e.g. the AES) may be used to encrypt the bitstream that may be stored for example in a flash memory. Then, the encrypted bitstream may be decrypted using the corresponding decryption algorithm, the decrypted content being fed into a programmed FPGA for further processing. In another application of the invention to communication systems, encryption may be used for example to secure data or files transmitted by a transmitter (e.g. a client) to a receiver (e.g. a server) over an unsecure transmission channel.

In some embodiments, data/signals encryption may use one or more encryption mechanisms implementing one or more of error correcting codes (for example Hamming codes, BCH codes), hash functions, and secret key-based cryptographic algorithms (using symmetric or asymmetric keys). Symmetric encryption algorithms may be chosen in a group comprising DES, 3DES, AES, and RC4. Asymmetric encryption algorithms may be chosen in a group comprising RSA and ECDSA.

In embodiments in which encryption uses one or more secret cryptographic keys, the secret cryptographic keys may be previously stored in the cryptographic computing device 11 (in a centralized or distributed way) or may be generated (online or offline) by a random number generator and/or by a Physically Unclonable Function (PUF). In some embodiments, a random number generator may be chosen in a group comprising a pseudo-random number generator (PRNG) and a true random number generator (TRNG).

In some embodiments, the secret cryptographic key(s) may be destroyed on reboots and/or on shutdown and initialized (in a deterministic or random way) at the initialization of the cryptographic computing device 11.

In some embodiments, the encryption and decryption algorithms may be chosen based on trade-offs between performance, memory, and the security level required by an application and/or by a user.

The cryptographic computing device 11 may be configured to carry out, using one or more processors, cryptographic programs stored in memory means (also referred to as "memories") such as non-volatile memories, Random Access Memories (RAM), flash memories, mass storage (e.g. hard disks).

Memory means may be configured to store programs, as well as data. Thus, programs and data may transit from memory means to processor(s) where they can be executed.

As shown in FIG. 1, the cryptographic computing device 11 may comprise at least one processor 111 (also referred to as 'central processing unit (CPU)') and memory means 113 (also referred to hereinafter as 'main memory'), the processor 111 being configured to execute the cryptographic computer programs stored in the main memory 113 using one or more processing units (also referred to as 'cores'). The cryptographic computing device 11 may comprise one or more memory buses 117 configured to route directly or indirectly (for example via cache memories) data and/or instructions and/or memory addresses between the main memory 113 and the processor 111.

According to some embodiments, the main memory 113 may be chosen in a group comprising volatile memories, non-volatile memories, and a combination of both volatile and non-volatile memory units.

In some embodiments, the volatile memory may use one or more of the following memories: a Random Access Memory, a Dynamic Random Access Memory (DRAM), a Synchronous Dynamic Random Access Memory (SDRAM), a Static Random Access Memory (SRAM), a Thyristor Random Access Memory (T-RAM), and a Zero capacitor Random Access Memory (Z-RAM). Volatile memories are generally advantageous in terms of read/write performance, with a lower cost/footprint than the one of non-volatile writable memories.

In some embodiments, a non-volatile memory may use one or more of a Mask ROM, PROM, EPROM, EEPROM, NVRAM, Flash memory Solid-state storage, nvSRAM, FeRAM (Ferro-electric RAM), MRAM (Magnetic RAM), PRAM. Non-volatile memories are generally advantageous in terms of providing access to previously stored information upon reboot and/or power cycle.

Further, in some embodiments, the main memory 113 may comprise a data main memory configured to store data and an instructions main memory configured to store the instructions of computer programs.

According to some embodiments, the memory locations may correspond to physical addresses.

In some embodiments, the memory locations may correspond to virtual/logical addresses, the computer programs having no knowledge of the physical addresses. In such embodiments, the cryptographic computing device 11 may comprise a memory management unit (not shown in FIG. 1) configured to store the memory references used for virtual memory management. The memory management unit may be configured to perform the translation of virtual memory addresses to physical addresses. The memory management unit may be configured to handle at the same time memory protection, cache controls, and bus arbitration. Further, the memory management unit may be implemented as part of the processor 111 or as separate integrated circuit outside the processor 111.

In one embodiment, the cryptographic computing device 11 may comprise a single processor 111 configured to execute one or more instructions comprised in one or more cryptographic programs.

Alternatively, the cryptographic computing device 11 may be a multi-processor device, comprising at least two processors 111.

In some embodiments, the processor 111 may be a single core processor, comprising a single processing unit 1111.

In other embodiments, the processor 111 may be a multi-core processor, comprising a plurality of cores configured to perform tasks at a given time (as used for example in embedded systems, digital signal processing, or graphic processing units). The tasks may be software processes and/or threads scheduled by the operating system.

In such embodiments, the processor 111 may be a single computing component configured to run multiple instructions on separate cores at the same time, increasing the overall speed for program execution amenable to parallel computing. The different cores may be integrated onto a single integrated circuit die (also referred to as a "chip multiprocessor"), or onto multiple dies in a single chip package.

Each core may be split into hardware threads, each hardware thread having its own memory registers. The hardware threads may share several units such as logical or arithmetic units.

Further, the cores in the multi-core processor 111 may or may not share memory means (for instance cache memories). In some embodiments, the cores may be configured to implement message passing or shared-memory inter-core communication methods.

In embodiments in which the cryptographic computing device 11 is a multi-processor, the cryptographic computing device 11 may comprise one or more single-core processors and one or more multi-core processors.

Further, in some embodiments in which the cryptographic computing device 11 comprises a plurality of processors 111, the processors 111 may be centralized in space or distributed in space such as clusters and farms of servers.

According to some embodiments, the cryptographic computing device 11 may comprise at least one virtual processor 111, a virtual processor being a physical central processing unit that is assigned to a virtual machine (e.g. in cloud computing applications, cloud servers, etc).

The processor 111 may further comprise an arithmetic and logical unit (ALU) configured to perform arithmetic and logical operations, processor registers configured to supply operands to the ALU and store the results of ALU operations, and a control unit. The control unit may be configured to decode the program instruction. The control unit may be further configured to orchestrate (or coordinate):
  the fetching from memory means or from storage devices, and/or
  the execution of instructions by directing the coordinated operations of the ALU, of the registers and of other components of the cryptographic computing device 11 (for example peripheral devices 117).

The cryptographic computing device 11 may further comprise cache memories 115 accessible by the one or more processors 111, closer to the processor core(s) 1111, the processor cache 113 being configured to access the data and/or instructions comprised in the programs to be executed by the one or more processors 111.

The cryptographic computing device 11 may further comprise internal and/or external peripheral devices 117 including input devices, output devices, and input/output devices.

The cryptographic computing device 11 may have one or more interfaces that allow the use of the cryptographic computing device 11 as a peripheral device by desktop computers, although it is not host-dependent in the same way as other peripheral devices. This is for example the case of some modern computing devices such as digital watches, smart-phones and tablet computers.

Input devices may be configured to interact with or send data from the user to the computer. Exemplary input devices comprise keyboards, computer mice, graphic tablets, barcode readers, image scanners, microphones, webcams, game controllers, light pens, and digital cameras.

Output devices may be configured to provide output to the user from the computer. Exemplary output devices comprise computer displays, printers, projectors, computer speakers, webcams.

Input/Output devices may be configured to perform both functions. Exemplary Input/Output devices comprise touchscreens.

The cryptographic program comprises a collection of instructions and data, the data comprising secret information (also referred to as "secret data" or "secret values") such as secret cryptographic keys, the instructions being configured to perform specific cryptographic primitives when executed by a processor. A cryptographic primitive designates a specific cryptographic function (or operation) designed to perform a specific task in the cryptographic system such as authentication, public or private key-based encryption/decryption, hash function, and digital signature.

The format and semantics of the instructions are defined by the ISA (Instruction Set Architecture).

The cryptographic program may be written in a programming language (also referred to as 'source language'). The programming language may be associated with a corresponding execution model which defines and controls the scheduling and the execution order of the instructions.

In some embodiments, the processor(s) 111 may be configured to execute the instruction cycles sequentially according to an 'in-order-execution' model, i.e. each instruction being processed before the processing of the next instruction is started and according to an order specified by the program.

Alternatively, in some embodiments, the processor(s) 111 may be configured to execute the instruction cycles concurrently or in parallel using an 'out-of-order execution' model, the instruction cycles being for example scheduled using an instruction pipeline. Under such execution model, multiple instructions may be executed in parallel, especially when such instructions are independent.

The cryptographic program in the source programming language may be transformed by a compiler into another programming language, referred to as a "target language", (such as for example assembly language consisting of assembly instructions, object code, or machine code) to create an executable program that can be directly run/executed by the one or more processors 111.

As used hereinafter, an intermediate representation (IR) is a representation of a program in an intermediate language between the programming language and the machine code language internally used by the compiler or a virtual machine to represent the source code. Using an intermediate language, the source code of a program is translated into an intermediate form capable of representing the source code without loss of information and independently of the programming and machine code languages. Intermediate representations are used by compilers to manage the complexity of the compilation process and perform code optimization transformations.

The embodiments of the disclosure provide secure implementations of cryptographic programs based on masking countermeasures and random execution of independent instructions comprised in the cryptographic program. The determination of protected cryptographic programs from cryptographic programs written in a programming language according to the embodiments of the invention use an intermediate representation of the cryptographic program that represents the information (data and instructions) required to execute the cryptographic program.

In some embodiments, the cryptographic program may be written in a programming language or a hardware description language chosen in a group comprising the C language, the C++ language, the C# language, the Fortran language, the Python language, the Java language, the JavaScript language, the Eiffel language, the Sather language, the Cython language, the SystemTap language, the Verilog language, and the VHDL.

With reference to FIG. 1, there is shown a device 13 configured to protect a cryptographic program denoted by P implemented in the cryptographic computing device 11. The cryptographic program P comprises instructions such that the order of execution of these instructions is represented by an initial execution order defined by the order of the instructions in the cryptographic program P according to an 'in-order-execution' model.

The cryptographic program may be stored in the main memory 113 of the cryptographic computing device 11. The device 13 may be configured to receive/load a copy of the cryptographic program.

The device 13 may comprise a compiler 131 configured to compile the cryptographic program P, which provides an intermediate representation IR(P).

In some embodiments, the intermediate representation of the cryptographic program may be represented in any intermediate language targeting a virtual machine or a portable code machine chosen in a group comprising Java bytecode, the Microsoft's intermediate language, the Parrot intermediate language, the TIMI language that targets the IBM system i platform, the Microsoft P-code, and the intermediate languages used in the GNU compiler collection comprising the Register Transfer Language, the tree language GENERIC, the LLVM intermediate representation intermediate language, Tiny Code Generator (TGG), and VEX.

The intermediate representation IR(P) may be an in-memory data structure (e.g. graph-based or tree-based object-oriented structure) or a special tuple- or stack-based code or any combination thereof.

The intermediate representation may be language specific (e.g. Byte Code for Java) or language independent.

The intermediate representation IR(P) comprises the instructions executed in the cryptographic program and the variables, denoted by $V_1, V_2, \ldots, V_N$, used/required to execute these instructions, with N designating the total number of variables. An instruction represents an operation (also referred to as a 'statement' or a 'function'). A statement may be an assignment (an address assignment, a pointer assignment, or a value assignment), a loop header (e.g. a for loop header or a while loop header), a conditional jump, a comparison, or a computation function (e.g. subtractions, additions).

A computational function may be an arithmetic (linear, affine, or non-linear) function applicable to arithmetic variables or a Boolean (linear, affine, or non-linear) function applicable to binary variables.

Operations use and produce values. A 'variable' is a named storage place for values. Storing a value into a variable is also called 'assignment'. Values may include integers, pointers, floating point values and abstract values such as memory states.

A variable $V_n$ for n varying between 1 and N may correspond to an input variable of the cryptographic program, an output variable of the cryptographic program, or an internal variable used as an input of an instruction of the cryptographic program or generated as an output of an instruction of the cryptographic program.

A variable $V_n$ for n varying between 1 and N may be a scalar value, a binary value or an array of scalar or binary values of an arbitrary dimension.

A variable $V_n$ for n varying between 1 and N may correspond to plaintext(s) or ciphertext(s).

The device 13 may further comprise a processing unit 133 configured to determine a graph of dependencies denoted by G(P) (also referred to as 'dependencies graph') representing the dependencies between the variables $V_1, V_2, \ldots, V_N$ and/or the instructions comprised in the intermediate representation.

The dependencies graph G(P) is a directed graph comprising vertices called nodes and edges. A node represents an instruction of the intermediary representation IR(P). The label on a node determines the instruction represented by the node. An edge incident to a node (also referred to an 'input edge') represents both the input variables of the intermediary representation IR(P) on which the node's operation depends and the control conditions on which the execution of the operation depends. An edge emerging from a node (also referred to an 'output edge') represents the output variables of the intermediary representation IR(P) modified/generated by the instruction represented by the node based on its inputs and operation.

The dependencies graph G(P) is a representation of the cryptographic program that makes explicit the data dependencies and control dependencies for each instruction of the intermediary representation IR(P) associated with the cryptographic program.

A control dependency refers to a dependency between two instructions according to which an instruction executes if the previous instruction evaluates in a way that allows its execution.

A data dependency arises from two instructions which access or modify the same variable. Several data dependencies may arise comprising input dependencies, output dependencies, anti-dependencies, and flow dependencies.

An instruction $S_1$ is said to be input dependent on another instruction $S_2$ if and only if the same variable appears as input to both instructions.

An instruction $S_1$ is said to be output dependent on another instruction $S_2$ if and only if the two instructions have the same output variable.

An instruction $S_1$ is said to be anti-dependent on another instruction $S_2$ if and only if the output variable of the instruction $S_1$ is an input variable of the instruction $S_2$.

An instruction $S_2$ is said to be flow-dependent on a previous instruction $S_1$ when the instruction $S_2$ depends on the result of the previous instruction $S_1$.

An instruction $S_2$ has a control dependency on a preceding instruction $S_1$ if the result of the instruction $S_1$ determines whether instruction $S_2$ should be executed or not.

Masking countermeasures according to the embodiments of the disclosure are applied to mask the variables used for the execution of the cryptographic program to protect against side-channel attacks that target the variables in the cryptographic program that can be expressed as or are correlated to functions depending on the secret information and/or on known input or output data. Masking renders any variable independent from the secret values without modifying the program results or outputs.

Accordingly, the processing unit 133 may be further configured to protect the cryptographic program P by performing masking countermeasures to mask all the variables $V_2, \ldots, V_N$ used/required to execute the instructions comprised in the intermediary representation of the cryptographic program and randomly changing the order of execution of the independent instructions comprised in the intermediary representation of the cryptographic program.

The processing unit 133 may be first configured to determine a masked graph of dependencies denoted by $\mathcal{M}(G(P))$ by replacing each variable $V_n$ for $n=1, \ldots, N$ in the graph of dependencies $G(P)$ with a masked variable denoted $\mathcal{M}(V_n)$ by applying a masking scheme $\mathcal{M}$ to the variable $V_n$. Thus, all the variables in the masked graph of dependencies $\mathcal{M}(G(P))$ are masked.

According to some embodiments, the masking scheme may be a first order Boolean masking consisting in summing the variable with a secret value, a higher order Boolean masking, or any other more elaborated masking scheme.

In some embodiments, the masking scheme may be a $d^{th}$-order masking scheme that uses a plurality of d mask values denoted by $m_1, m_2, \ldots, m_d$ to mask each variable $V_n$, the processing unit 133 being configured to determine each masked variable $\mathcal{M}(V_n)$ from a given variable $V_n$ by splitting the given variable $V_n$ into a plurality of d+1 variables and applying a masking operation to the given variable $V_n$ and the plurality of d mask values $m_1, m_2, \ldots, m_d$ such that the masked variable can be expressed as function of the mask values and the given variable according to:

$$\mathcal{M}(V_n) = V_n \perp m_1 \perp \ldots \perp m_d \quad (1)$$

In equation (1), the operator $\perp$ designates a group operation (e.g. addition or multiplication).

According to some embodiments, the masking scheme may be an additive scheme, the masking operation being an arithmetic or a Boolean addition operation over a given group structure. For example, additive arithmetic masking scheme may be applied to arithmetic real-value variables such that the masked variable is given by:

$$\mathcal{M}(V_n) = V_n + m_1 + \ldots + m_d \quad (2)$$

In equation (2), the addition operation is performed over the field of real numbers.

In another example, additive Boolean masking scheme may be applied to binary variables such that the masked variable is given by:

$$\mathcal{M}(V_n) = V_n \oplus m_1 \oplus \ldots \oplus m_d \quad (3)$$

In equation (3), the addition operation denoted by $\oplus$ corresponds to the Exclusive-OR operation.

Additive masking is compatible with linear and affine operations performed during cryptographic computations.

According to some embodiments, the masking scheme may be a multiplicative scheme using invertible mask values, the masking operation being a multiplicative arithmetic of Boolean multiplicative operation over a given group structure. For example, multiplicative Boolean masking may be applied to binary variables such that the masked variable is given by:

$$\mathcal{M}(V_n) = V_n \otimes m_1 \otimes \ldots \otimes m_d \quad (4)$$

Multiplicative masking is compatible with non-linear operations such as power functions.

According to some embodiments, the processing unit 133 may be configured to determine the mask values $m_1, m_2, \ldots, m_d$ randomly using a Pseudo Random Number Generator (PRNG) or a True Random Number Generator (TRNG).

According to some embodiments, the processing unit 133 may be configured to change the mask values $m_1, m_2, \ldots, m_d$ regularly at regular time intervals.

According to some embodiments, the masked graph of dependencies may comprise additional nodes representing values and/or instructions used for determining at least one masked variable and/or for generating or modifying the mask values $m_1, m_2, \ldots, m_d$ used by the masking scheme to determine the masked variables $\mathcal{M}(V_2)$ for $n=1, \ldots, N$.

The processing unit 133 may be configured to determine the masked graph of dependencies $\mathcal{M}(G(P))$ using a static analysis and/or a symbolic execution of the graph of dependencies. Static analysis enables the analysis of the graph of dependencies without executing the cryptographic program, i.e. without executing the instructions comprised in the graph of dependencies. Symbolic execution enables executing the instructions comprised in the graph of dependencies using symbolic values of the program inputs instead of the concrete values and processing the instructions involving the symbolic values. Static analysis and symbolic execution enable analyzing the cryptographic program in its graph of dependencies form when the variables are masked.

The data and control dependencies represented in the masked graph of dependencies $\mathcal{M}(G(P))$ may determine the sequencing between the instructions and the ordering that must be followed to preserve the semantics of the original cryptographic program.

The analysis of the data and control dependencies represented in the masked graph of dependencies $\mathcal{M}(G(P))$ produces execution-order constraints between instructions and determines whether it is safe to re-order or parallelize instructions to make a better use of the computational and memorization resources of the cryptographic computing device 11.

The processing unit 133 may be further configured to determine, using the masked graph of dependencies $\mathcal{M}(G(P))$, at least a set of independent instructions denoted by $\mathcal{S} = \{I_1, I_2, \ldots, I_L\}$ comprising $L \geq 2$ independent instructions, independent instructions in the set $\mathcal{S}$ being not linked by edges in the masked graph of dependencies $\mathcal{M}(G(P))$. The independent instructions $I_l$ for $l=1, \ldots, L$ being ordered in the set S according to their initial order of execution in the cryptographic program P such that instruction $I_1$ is the first instruction to be executed and instruction $I_l$ is to be executed before instruction $I_{l+1}$ for $l=2, \ldots, L-1$.

The independent instructions may correspond to instructions of the cryptographic program and additional instructions required to generate the mask values used to apply the masking scheme to mask the variables.

Given the set of independent instructions, the processing unit 133 may be configured to determine an execution order from the initial execution order, the determined execution order representing the order of executing the independent instructions comprised in the set S of independent instructions by at least one processor 111. The processing unit 133 may be configured to determine the execution order by applying a random permutation denoted by $\pi$ to the initial execution order of the independent instructions $I_1, I_2, \ldots, I_L$. The independent instructions are then to be executed by at least one processor 111 according to the determined execution order according to $I_{\pi(1)}, I_{\pi(2)}, \ldots, I_{\pi(L)}$ such that instruction $I_{\pi(1)}$ is to be executed firstly and that instruction $I_{l'}$ is to be executed before instruction $I_{l'+1}$ for $l'=\pi(l)$ and $l=1, \ldots, L$.

The processing unit 133 may be further configured to determine a protected cryptographic program, the protected cryptographic program being represented by the masked graph of dependencies $\mathcal{M}(G(P))$ and the execution order of the independent instructions comprised in the sets of independent instructions $I_1, I_2, \ldots, I_L$.

The generated protected cryptographic program may be then compiled by the compiler 131 to produce a protected executable program code that may be stored in the main memory 113 of the cryptographic computing device 11 for a later execution.

According to some embodiments, the device 13 may be implemented within the cryptographic computing device 11 as a part of a same manufactured product.

In other embodiments, the device 13 may be a hardware independent device of the cryptographic computing device 11 connected or connectible to the cryptographic computing device 11 as an additional or external hardware.

Figure 3:
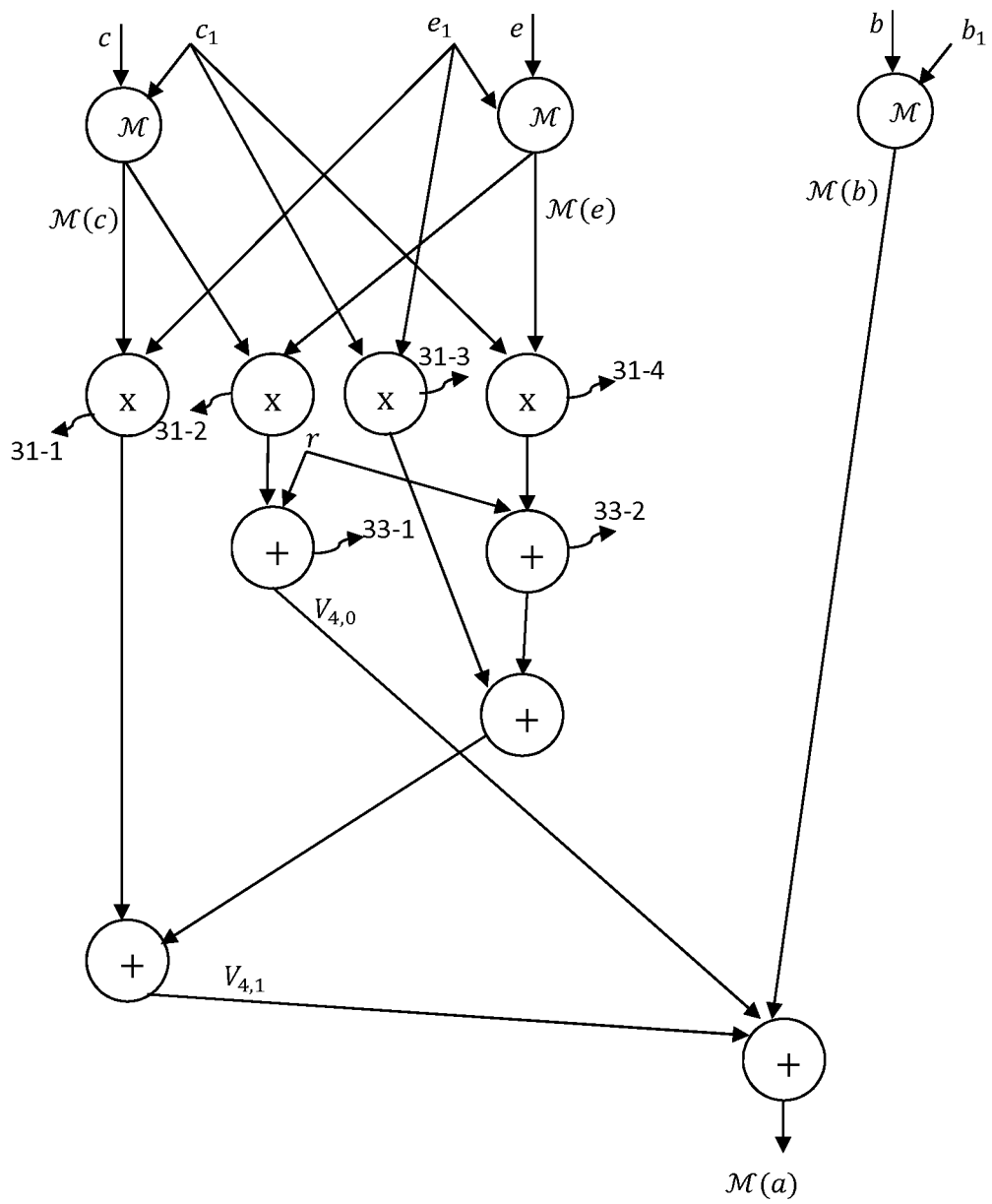
FIG. 3 is a graph representation depicting an exemplary protection of the graph of dependencies illustrated in FIG. 2D, according to some embodiments using an ISW masking algorithm.

Referring to FIG. 3, an example of a program P protected according to the embodiments of the invention is shown.

In FIG. 2A, the program P is given by the instruction:

$$I: a = b + c \times e$$

FIG. 2B corresponds to an intermediate representation of the program P. The intermediate representation comprises five instructions $S_1, \ldots, S_5$ and five variables $V_1, \ldots, V_5$, the variables $V_1$, $V_2$ and $V_3$ being input variables of the program, the variable $V_4$ corresponding to an internal variable resulting from the computation performed in instruction $S_4$, and the variable $V_5$ being an output variable of the program. Instructions $S_1$, $S_2$ and $S_3$ correspond to assignment operations, while instruction $S_4$ corresponds to an addition operation, and instruction $S_5$ corresponds to a multiplication operation.

FIG. 2C depicts the graph of dependencies representing the dependencies between the instructions $S_1, \ldots, S_5$ and the variables $V_1, \ldots, V_5$. Nodes are labeled with the corresponding instructions and edges are labeled with the corresponding variables.

FIG. 2D depicts a masked graph of dependencies determined from the graph of dependencies of FIG. 2C by replacing each variable with a masked variable obtained by applying a $d^{th}$-order masking scheme $\mathcal{M}$. The masked graph of dependencies comprises additional values corresponding to the mask values $m_1, \ldots, m_d$ represented by edges labeled with the mask values. The masked graph of dependencies also comprises additional nodes labeled with the masking scheme $\mathcal{M}$ and corresponding to instructions executed when applying the masking scheme to each variable.

Referring to FIG. 3, there is shown an example of a masked graph of dependencies obtained by masking the variables depicted in FIG. 2C by applying the Ishai-Sahai-Wagner (ISW) first order masking scheme.

According to the first order ISW masking scheme, each input variable c, e, and b is split into two variables such that:

$$c = c_0 + c_1 \quad (5)$$

$$e = e_0 + e_1 \quad (6)$$

$$b = b_0 + b_1 \quad (7)$$

In equations (5)-(7), $c_1$, $e_1$, and $b_1$ are mask values and $c_0 = \mathcal{M}(c) = c + c_1$, $e_0 = \mathcal{M}(e) = e + e_1$, and $b_0 = \mathcal{M}(b) = b + b_1$ are the masked variables obtained by the masking of the variables c, e, and b, respectively.

The instructions shown in FIG. 2C comprise a multiplicative operation performed in instruction $S_4$: $V_4 = c_0 \times e_0$ that produces the variable $V_4$. The ISW masking scheme provides a way to mask the variable $V_4$ and to determine a masked variable $\mathcal{M}(V_4)$ to replace the variable $V_4$ in the masked graph of dependencies from the mask values and the masked variables related to the masking of the operand variables c and e, and an auxiliary random variable denoted by r. According to the ISW masking scheme, the variable $V_4$ can be written as a function of a mask value denoted by $V_{4,1}$ and the masked variable $\mathcal{M}(V_4) = V_{4,0}$ according to:

$$V_4 = V_{4,0} + V_{4,1} \quad (8)$$

The mask value $V_{4,1}$ and the masked variable $V_{4,0}$ are expressed, according to the ISW masking scheme of the multiplication operation, as:

$$V_{4,0} = c_0 \times e_0 + r \quad (9)$$

$$V_{4,1} = c_1 \times e_1 + c_0 \times e_1 + c_1 \times e_0 + r \quad (10)$$

The masking scheme accordingly introduces additional addition and multiplicative operations required to compute the mask value $V_{4,1}$ and the masked variable $V_{4,0}$ as well as additional variables comprising the random variable r. The masked graph of dependencies accordingly comprises additional nodes corresponding to the additional operations involved in the masking of variables and additional edges labeled with the additional variables obtained during the masking.

Given the masked graph of dependencies illustrated in FIG. 3, several sets of independent instructions may be determined comprising a first set of the instructions labeled 31-1, 31-2, 31-3, and 31-4, and the second set of the instructions labeled 32-1 and 32-2. The processing unit 133 may be configured to change the execution order of the instructions in each set such that the instructions can be executed in a randomly permuted execution order.

Figure 4A:
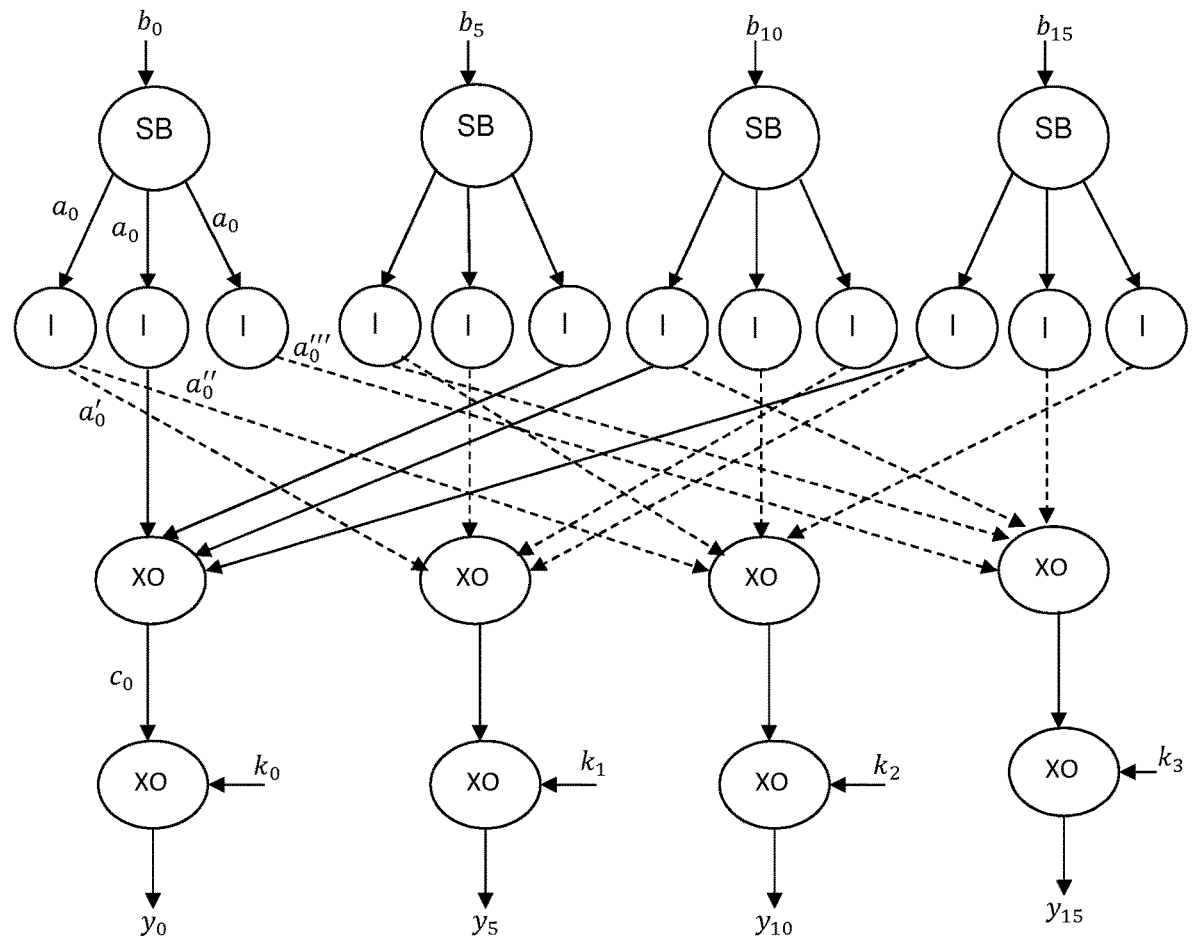
FIG. 4A represents a graph of the dependencies of an AES block cipher.
Figure 4B:
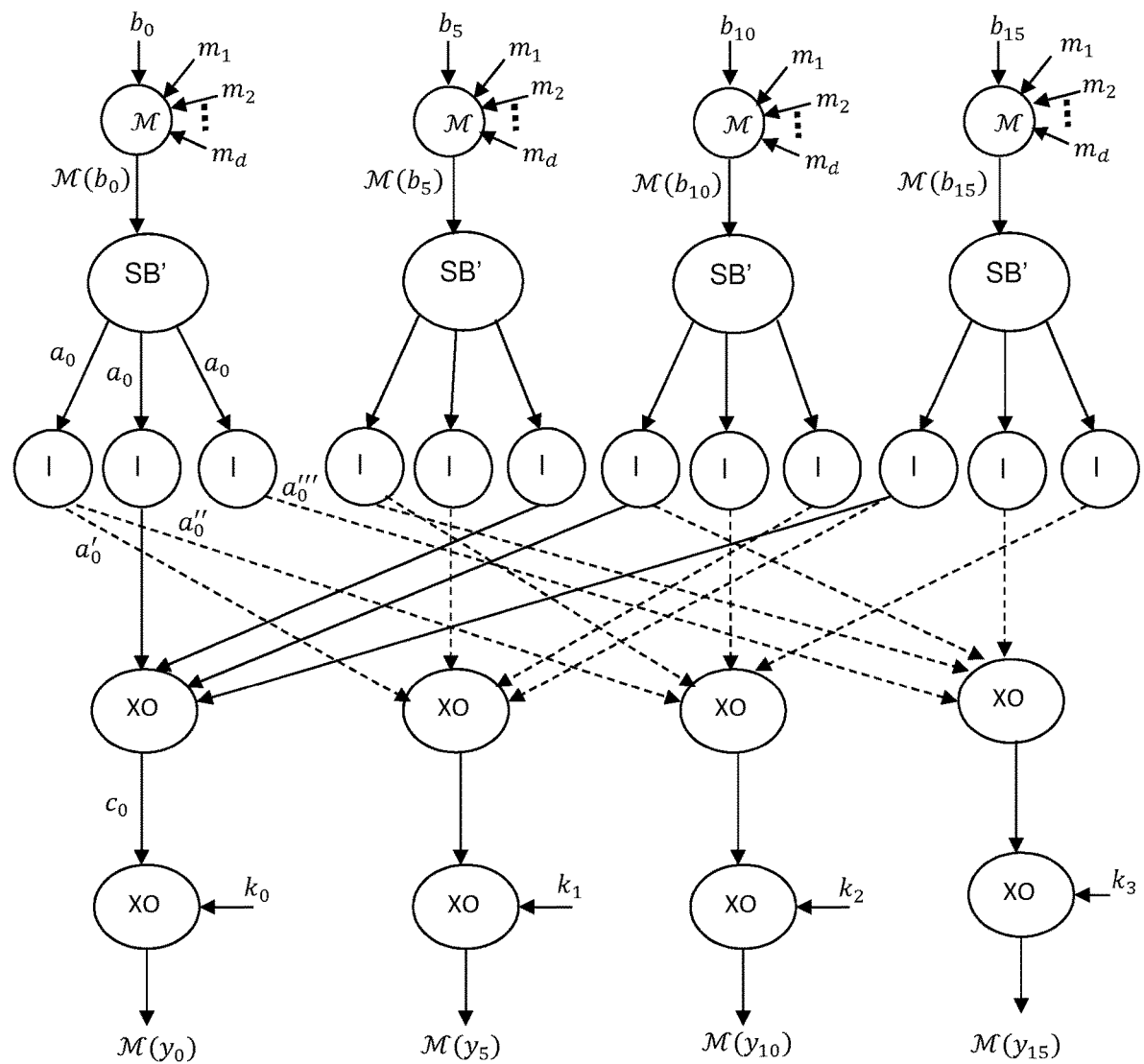
FIG. 4B is a graph representing a protection of the graph of dependencies of an AES block cipher corresponding to the graph of dependencies depicted in FIG. 4A, according to some embodiments.

Referring to FIGS. 4A and 4B, an example of a protected graph of dependencies of the AES block cipher implemented in a cryptographic computing device 11 according to some embodiments, is depicted.

FIG. 4A depicts an unprotected graph of dependencies of the AES block cipher and FIG. 4B depicts a protected graph of dependencies of a protected AES block cipher according to some embodiments of the disclosure using a masking scheme denoted by M.

The AES block cipher operates on a 4×4 array of bytes called the state and represented in a matrix form as:

$$\begin{bmatrix} b_0 & b_4 & b_8 & b_{12} \\ b_1 & b_5 & b_9 & b_{13} \\ b_2 & b_6 & b_{10} & b_{14} \\ b_3 & b_7 & b_{11} & b_{15} \end{bmatrix},$$

Such matrix comprises 16 bytes $b_0, \ldots, b_{15}$.

The state is initialized by the plaintext value and holds the ciphertext value at the end of the encryption. The AES block cipher consists in iterating, during a specified number of iterations, round transformations comprising several operations. The number of rounds performed in the AES block cipher is either 10, 12, or 14 rounds, depending on the key length (10 rounds for 128-bit keys, 12 rounds for 192-bit keys, and 14 rounds for 256-bit keys). Each round, except the first and the last rounds, is composed of four stages: AddRoundKey, SubBytes, ShiftRows, and MixColumns. The first round comprises only an AddRoundKey stage according to which each byte of the state is combined with a block of the round key using a bitwise XOR operation. The last round omits the MixColumns stage.

FIG. 4A and FIG. 4B are graph representations illustrating the intermediate rounds of the AES block cipher operating on the bytes $b_0$, $b_5$, $N_0$, and $b_{15}$. The first and the last rounds are not represented in FIGS. 4A and 4B.

Each round of the AES encryption is an iterative process: the bytes labeled $y_0$, $y_5$, $y_{10}$ and $y_{15}$, which are the outputs of one iteration of the round, loop back on the bytes $b_0$, $b_5$, $b_{10}$ and $b_{15}$, which are the inputs of the next iteration of the round.

The graph representations depicted in FIGS. 4A and 4B illustrate the protection of cryptographic programs in an exemplary application of the invention to the AES block cipher used for encryption. The following description of the processing steps will be focused on the byte $b_0$ and on the operations applied during one iteration of an intermediate round of the AES block cipher encryption, for illustration purpose.

Accordingly, in the graphs of dependencies depicted in FIGS. 4A and 4B, the edges represent the variables used in an intermediate round of the AES encryption and the nodes represent the operations performed on these variables. Nodes are labeled with the corresponding instructions/operations and edges are labeled with the corresponding variables.

FIG. 4A depicts a graph of dependencies of the AES block cipher of the prior art. The first operation applied to the byte $b_0$ in the round is the substitution box labeled in FIG. 4A with SB. The Substitution box is a bijective non-linear operation. The output of the Substitution box applied to the byte $b_0$ is the intermediate variable labeled $a_0$ in FIG. 4A.

The intermediate variable $a_0$ is the input of three instructions labeled I1, I2, and I3 in FIG. 4A. These operations are linear and performed in a Galois field.

The outputs of the instructions I1, I2, and I3, respectively labeled $a'_0$, $a''_0$, and $a'''_0$ are then mixed with the results of the corresponding operations performed on the bytes $b_5$, $b_{10}$, and $b_{15}$. The mix operation represent the Mixcolumn stage of the AES block cipher and consists in an XOR operation applied to the four inputs. The Mixcolumn operation is equivalent to three successive XOR operations operating on two inputs. The output of the Mixcolumn operation corresponding to the byte $b_0$ is the variable labeled $c_0$ in FIG. 4A.

The next operation performed on the variable $c_0$ corresponds to the Addroundkey stage and consists in mixing, via an XOR operation, the variable $c_0$ with a key labeled $k_0$ in FIG. 4A. The output of the Addroundkey operation corresponding to the byte $b_0$ is the variable $y_0$ that will be used as an input of the next iteration of the round.

FIG. 4B depicts a masked graph of dependencies determined by replacing each variable of the graph of dependencies with a masked variable obtained by applying a $d^{th}$-order masking scheme $\mathcal{M}$. The masked graph of dependencies comprises additional values corresponding to the mask values $m_1, \ldots, m_d$ represented by edges labeled with the mask values. The masked graph of dependencies also comprises additional nodes labeled with the masking scheme $\mathcal{M}$ and corresponding to instructions executed when applying the masking scheme to each variable.

Accordingly, the byte $b_0$ is masked and replaced with the masked value $\mathcal{M}(b_0)$. The masked value $\mathcal{M}(b_0)$ is then processed by a Substitution box labeled SB' that implements a masked version of the Substitution Box stage.

The masked variable is then processed by the three instructions I1, I2, and I3.

Figure 5:
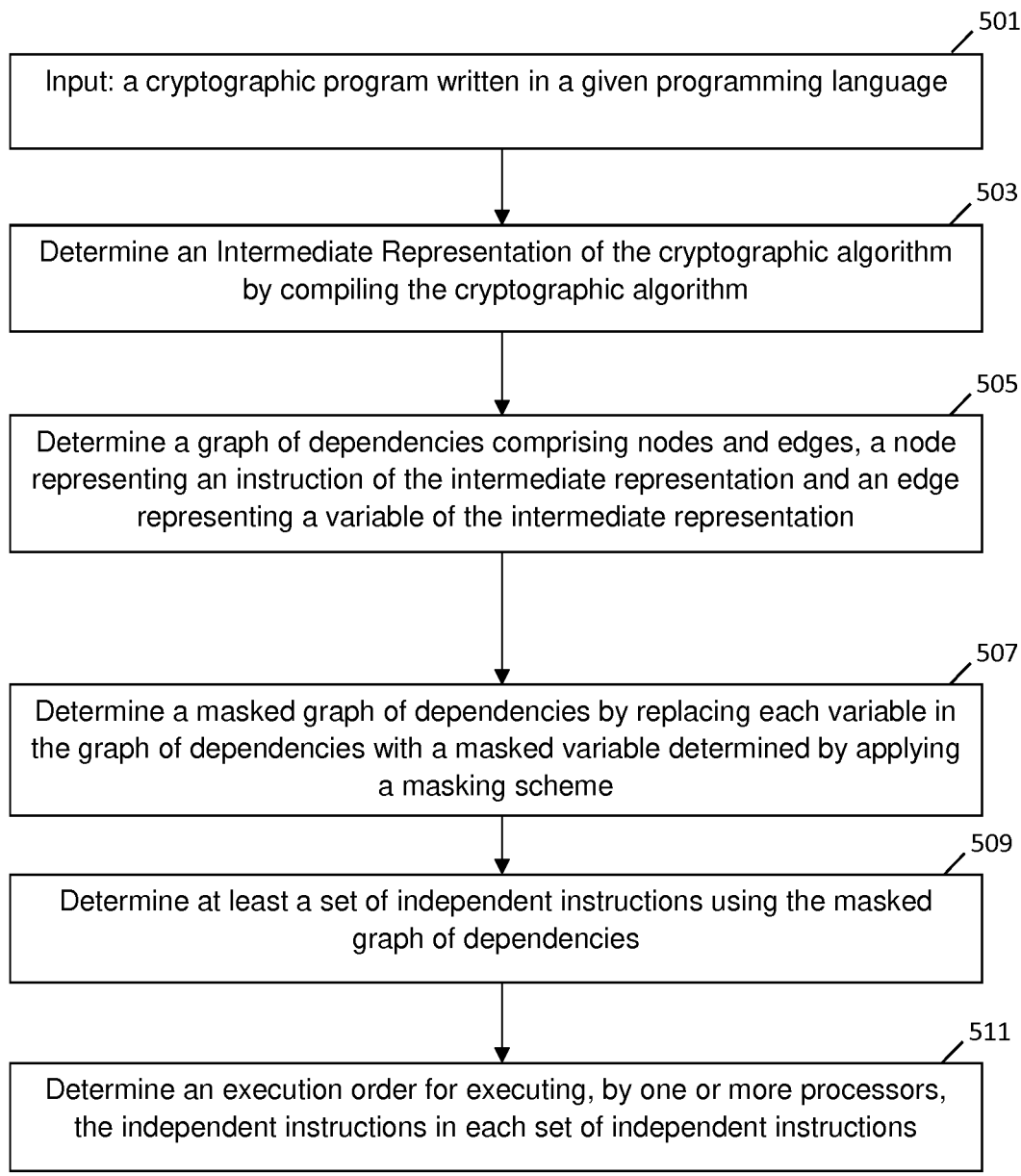
FIG. 5 is a flowchart illustrating a method for protecting a cryptographic program, according to some embodiments of the invention.

Referring to FIG. 5, there is shown a method for protecting a cryptographic program P implemented in a cryptographic computing device 11 according to some embodiments. The cryptographic program comprises instructions and is associated with an initial execution order of the instructions defined by the order of the instructions in the cryptographic program.

At step 501, a cryptographic program written in a given programming language may be received.

At step 503, an intermediate representation IR(P) of the cryptographic program P may be determined by compiling the cryptographic program. The intermediate representation comprises the instructions executed in the cryptographic program and all variables required to execute these instructions.

At step 505, a graph of dependencies comprising nodes and edges may be determined, a node representing an instruction of the intermediate representation and an edge representing a variable of the intermediate representation.

At step 507, a masked graph of dependencies may be determined by replacing each variable in the graph of dependencies with a masked variable determined by applying a masking scheme to the variable.

At step 509, at least a set of independent instructions may be determined using the masked graph of dependencies, independent instructions in each set of independent instructions being not linked to each other by edges.

At step 511, an execution order for executing instructions in each set of independent instructions may be determined by applying a random permutation to the initial execution order of the independent instructions.

The masked graph of dependencies in which all variables are masked and the order of execution of independent instructions in the sets of independent instructions provide a protected version of the cryptographic program that may be stored or compiled to generate an executable protected program.

The methods described herein can be implemented themselves by computer program instructions supplied to the processor of any type of computer to produce a machine with a processor that executes the instructions to implement the functions/acts specified herein.

These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

The program code embodying any of the embodiments of the invention described herein is capable of being individually or collectively distributed as a program product in a variety of different forms. In particular, the program code may be distributed using computer-readable media, which may include computer-readable storage media and communication media. Computer-readable storage media, which are inherently non-transitory, may include volatile and non-volatile, and removable and non-removable tangible media implemented in any method or technology for storage of information, such as computer-readable instructions, data structures, program modules, or other data.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. A device adapted to protect a cryptographic program implemented in a cryptographic computing device, said cryptographic computing device comprising one or more processors, the cryptographic program comprising instructions and being associated with an initial execution order of the instructions, wherein the device comprises a compiler configured to compile sad cryptographic program, which provides an intermediate representation of said cryptographic program comprising instructions and variables used to execute said instructions, the device further comprising a processing unit configured to:
   determine a graph of dependencies comprising nodes and edges and representing the dependencies between the variables and/or the instructions comprised in said intermediate representation, each node of said graph representing an instruction of said intermediary representation, and each edge of said graph representing a variable of said intermediary representation;
   determine a masked graph of dependencies by replacing each variable of the graph of dependencies with a masked variable, the processing unit determining sad masked variable by applying a masking scheme to said variable, said masking scheme using mask values, which provides the masked graph of dependencies, the masked graph of dependencies comprising additional nodes representing values and/or instructions used for determining at least one masked variable and/or for generating or modifying the mask values used by the masking scheme to determine the masked variables, wherein the processing unit is configured to determine the masked graph of dependencies using a static analysis of the graph of dependencies without executing the cryptographic program and/or a symbolic execution of the graph of dependencies;
   determine at least a set of independent instructions using said masked graph of dependencies, independent instructions in the set of independent instructions being not linked by edges in the masked graph of dependencies;
   determine an execution order for each set of independent instructions from said initial execution order, said execution order representing the order of execution of said set of independent instructions by at least one of said one or more processors, said processing unit being configured to determine an execution order for each set of independent instructions by applying a random permutation to the initial execution order of the independent instructions; and
   the device providing a protected cryptographic program being represented by the masked graph of dependencies and said determined execution order of the independent instructions, the device being configured to compile said protected cryptographic program to produce a protected executable program code.

2. The device of claim 1, wherein said masking scheme is a $d^{th}$-order masking scheme that uses a plurality of d mask values to mask each variable, the processing unit being configured to determine each masked variable from a given variable by splitting said given variable into a plurality of d+1 variables and applying a masking operation to said given variable and said plurality of d mask values.

3. The device of claim 2, wherein said masking scheme is an additive masking scheme, said masking operation being an arithmetic or a boolean addition operation over a given group structure.

4. The device of claim 2, wherein said masking scheme is a multiplicative masking scheme, said masking operation being a multiplicative operation over a given group structure.

5. The device of claim 2, wherein the processing unit is configured to determine said mask values randomly using a Pseudo Random Number Generator (PRNG) or a True Random Number Generator (TRNG).

6. The device of claim 2, wherein the processing unit is configured to change said mask values at regular time intervals.

7. The device of claim 1, wherein said initial execution order of the instructions is defined by the order of execution of said instructions in the cryptographic program.

8. The device of claim 1, wherein the nodes representing the independent instructions of each set of independent instructions in the graph of dependencies are not linked to each other by edges.

9. A method for protecting a cryptographic program implemented in a cryptographic computing device comprising one or more processors, the cryptographic program comprising instructions and being associated with an initial execution order of the instructions, wherein the method comprises:
   compiling said cryptographic program, which provides an intermediate representation of said cryptographic program comprising instructions and variables used to execute said instructions;
   determining a graph of dependencies comprising nodes and edges, and representing the dependencies between the variables and/or the instructions comprised in said intermediate representation, each node of said graph representing an instruction of said intermediary representation, each edge of said graph representing a variable of said intermediary representation;
   determining a masked graph of dependencies by replacing each variable in the graph of dependencies with a masked variable determined by applying a masking scheme to said variable, said masking scheme using mask values, which provides the masked graph of dependencies, the masked graph of dependencies comprising additional nodes representing values and/or instructions used for determining at least one masked variable and/or for generating or modifying the mask values used by the masking scheme to determine the masked variables, wherein the one or more processors are configured to determine the masked graph of dependencies using a static analysis of the graph of dependencies without executing the cryptographic program and/or a symbolic execution of the graph of dependencies;
   determining at least a set of independent instructions using sad masked graph of dependencies, independent instructions in the set of independent instructions being not linked by edges in the masked graph of dependencies;

determining an execution order for each set of independent instructions from said initial execution order, said execution order representing the execution order of said set of independent instructions by at least one of sad one or more processors, and execution order being determined for each set of independent instructions by applying a random permutation to the initial execution order of the independent instructions; and the method providing a protected cryptographic program being represented by the masked graph of dependencies and said determined execution order of the independent instructions, the method compiling said protected cryptographic program to produce a protected executable program code.

* * * * *